3,131,226
FLUORINATION OF CHLORINE AND BROMINE
SUBSTITUTED HYDROCARBONS
Franciszek Olstowski, Freeport, and John D. Watson, Sr., and John J. Newport, Lake Jackson, Tex., assignors to The Dow Chemical Company, Midland, Mich., a corporation of Delaware
No Drawing. Filed Oct. 3, 1960, Ser. No. 59,802
15 Claims. (Cl. 260—653.8)

This invention pertains to the fluorination of chlorine and bromine substituted hydrocarbons. More particularly it pertains to the fluorination of the substituted hydrocarbons in the vapor phase in the presence of a fluorosilicate.

The use of a fluorosilicate as a fluorinating agent in a liquid phase reaction of chlorine containing alkanes is known. The fluorosilicate ground to a fine size is usually mixed with the liquid chlorine substituted hydrocarbon and the mixture heated in an autoclave to obtain the fluorination. While good yields have been obtained by this method, high pressures have to be used for certain chlorine substituted hydrocarbons to effect the reaction. High pressure liquid phase reactions are more costly to carry out and require specialized equipment. It is thus very desirable to provide a process where substituted hydrocarbons can be fluorinated in a vapor phase under low pressures.

It is therefore an object of this invention to provide a vapor phase process for the fluorination of chlorine and bromine substituted hydrocarbons by use of a fluorosilicate as a fluorinating agent. A further object is to provide a process for the fluorination of substituted hydrocarbons with a fluorosilicate using low pressures.

The above and other objects are attained according to the invention by passing the vaporized hydrocarbon into contact with a mixture of fluorosilicate, such as sodium fluorosilicate, potassium fluorosilicate, and barium fluorosilicate, and a heavy metal chloride, such as chromium chloride, ferric chloride, tungsten chloride, molybdenum chloride, bismuth chloride, and antimony chloride and mercury chloride at a temperature of from 100° to 400° C. to fluorinate the substituted hydrocarbon. The metal chloride functions as a catalyst and is intermixed with the fluorosilicates in an amount of from 0.5 to 20 weight percent.

Various known methods for contacting solids with gases may be used for carrying out the reaction. The most convenient way is to use a fluidized bed or to have the fluorosilicate and the heavy metal catalyst in a larger particulate size and in a fixed bed. The bed is heated to the desired reaction temperature and the chlorine or bromine substituted hydrocarbon in vapor phase is passed through the bed. The effluent leaving the bed is cooled and the fluorinated hydrocarbons are then recovered and separated by known means. After substantially all of the fluorosilicate has been reacted, the heavy metal catalyst is recovered, intermixed with more fluorosilicate, and the bed repacked. More than one bed may be used in a continuous process.

Although a reaction temperature in the range of 100° to 400° C. is usually employed, a temperature of from 150° to 350° C. is preferred. Only a short contact time of the substituted hydrocarbon and the fluorosilicate containing the catalyst is required to effect the fluorination at the reaction temperature. In a fixed bed an average residence time of from 1 to 30 seconds is generally used with 10 to 20 second being preferred.

Sodium fluorosilicate, potassium fluorosilicate and barium fluorosilicate are effective as fluorinating agents. Of these, sodium fluorosilicate is preferred. The sodium fluorosilicate is usually intermixed with chromic chloride as the preferred heavy chloride catalyst. The amount of the catalyst in the fluorosilicate may be varied from around 0.5 to 20 weight percent. Generally around 5 to 10 percent of the heavy metal chloride is employed. Very little advantage is gained in using more than 10 percent except in special cases where appreciable thermal decomposition of the hydrocarbon is obtained. In passing a number of the vaporized substituted hydrocarbons through the bed at the reaction temperature some thermal decomposition of the hydrocarbon may be obtained. The decomposition often results in coating of the catalyst with carbon. This decreases the effectiveness of the catalyst. Thus, while a small percentage of catalyst, such as for example 0.5 weight percent, may be effective in accelerating the fluorination reaction, generally at least 1 and up to 5 or 10 percent of the catalyst is preferred so that enough catalyst would be available even though a portion of the catalyst may be rendered less effective due to the carbon deposit. The carbon deposition on the catalyst and in the bed can be greatly reduced by the addition of chlorine or bromine to the vaporized hydrocarbon stream. Generally from 2 to 20 volume percent of the gaseous halogen may be thus used in the hydrocarbon stream.

Any chlorine or bromine substituted hydrocarbon which may be vaporized without decomposition may be used in the fluorination. However, substituted aliphatic hydrocarbons having from 1 to 8 carbon atoms are generally used. Since low molecular weight fluorine-containing hydrocarbons have a wide utility, substituted aliphatic hydrocarbons having from 1 to 4 carbon atoms are most often fluorinated.

Illustrative examples of the substituted hydrocarbon which may be fluorinated are carbon tetrabromide, methylbromide, dibromoethane, hexabromoethane, propylene bromide, trichloromethane, dichloromethane, dichloroethane, perchloroethane, propylene chloride, chlorobutane, and chlorohexane.

In addition to using substituted hydrocarbons, a combination of gaseous reactants which react to form chlorine or bromine substituted hydrocarbons at the reaction temperature may be used to form the substituted hydrocarbon in situ. For example, instead of using a chloromethane, chlorine and methane may be passed into the bed. At the reaction temperature chlorination of the methane is obtained which is then fluorinated by being contacted with the fluorosilicate.

Normally the substituted hydrocarbon is vaporized and contacted with the fluorosilicate at atmospheric pressure. However, with the higher molecular weight hydrocarbons it may be desirable at times to reduce the pressure in order to aid in the vaporization. Thus, a pressure as low as 200 or 300 millimeters of mercury may be employed. With low boiling point hydrocarbons a pressure above atmospheric may be sometimes desired.

Upon passing the vaporized substituted hydrocarbon in contact with the fluorosilicate, the product obtained generally contains a mixture of compounds of different degrees of fluorination. For example, when carbon tetrachloride is used as the reactant, it is fluorinated to different degrees so that the compounds obtained vary from those resulting from complete substitution of all of the chlorines with fluorine as carbon tetrafluoride to compounds having only one of the chlorines substituted such as trichlorofluoromethane. Further fluorination may be obtained by recycling the partially fluorinated compounds again through the bed.

The examples below further illustrate the invention.

*Example 1*

A nickel reactor, 5/8" I.D. x 24" long, wound with an electric heating tape, was filled with 130 grams of sodium fluorosilicate containing 10 weight percent of chromic chloride. The reactor containing the fluorosilicate and the catalyst was heated to 350° C. and carbon tetrachloride at a rate of 20 milliliters per hour was vaporized and passed through the reactor. An average residence time in the reactor was about 15 seconds. The reactor was operated for 2 hours during which time approximately 0.47 gram mole of carbon tetrachloride was passed through the reactor.

The gas product coming from the reactor was cooled by passing it through a Dry Ice-acetone cold trap and then collected in a water displaced gas collector. The product collected was analyzed by infrared. It was found that 0.38 gram mole of carbon tetrachloride had reacted in the two hours forming 0.223 gram mole of fluorocarbons. The composition of the fluorine containing hydrocarbons obtained was as follows:

| Fluorocarbon: | Volume percent |
| --- | --- |
| $CFCl_3$ | 17.5 |
| $CF_2Cl_2$ | 46.6 |
| $CF_3Cl$ | 35.0 |
| $CF_4$ | 0.9 |

The above result gave a 58.7 percent conversion of carbon tetrachloride to fluorocarbons.

Similar results are obtained when dibromomethane trichloromethane and trichlorobromomethane are used in place of carbon tetrachloride and when nickel chloride, ferric chloride, or antimony chloride is used as catalyst in place of the chromic chloride.

To illustrate the effect of the catalyst, the above run was repeated except that the reactor was filled with 130 grams of sodium fluorosilicate to which no catalyst had been added. After operating for 2 hours, 0.023 gram mole of $CFCl_3$ and less than .002 gram mole of $CF_2Cl_2$ were collected. This represented only a 5 percent conversion of the carbon tetrachloride to fluorocarbons.

To illustrate the effects of percentage of catalyst, the run above was repeated with the exception that 5 weight percent of chromic chloride catalyst was used instead of the 10 weight percent. In a 2 hour run a 45.4 percent conversion of carbon tetrachloride to fluorocarbons was obtained.

The run was again repeated with the exception that 0.5 weight percent of catalyst was used instead of 5. In this run only a 9.8 percent conversion of the carbon tetrachloride to fluorocarbons was obtained.

A second run was made similarly to that described above with the exception that trichloromethane instead of carbon tetrachloride was passed through the sodium fluorosilicate bed containing 10 weight percent of chromic chloride. $CF_3H$ was the only fluorocarbon obtained in the effluent when a contact time of 20 seconds was used.

*Example II*

A run was made where a gas mixture of chlorine and methane was passed through a bed of 40 grams of sodium fluorosilicate containing 15 weight percent chromic chloride. The mole ratio of chlorine to methane used was 5 to 1. A contact time of about 15 seconds was used and the bed was heated to about 400° C. By infrared analysis it was found that the fluorine containing hydrocarbons in the following ratios were obtained:

| Fluorocarbon: | Mole percent |
| --- | --- |
| $CFCl_3$ | 14 |
| $CF_2Cl_2$ | 51 |
| $CF_2HCl$ | 10 |
| $CF_3H$ | 22 |

*Example III*

To illustrate the improvement obtained by addition of a halogen to the vaporized substituted hydrocarbon, a run was made in a manner similar to that described in Example I with the exception that only 5 weight percent chromic chloride was used. The reactor was heated to 350° C. and carbon tetrachloride was fed to the reactor at the rate of about 20 milliliters per hour. The estimated residence time for the carbon tetrachloride in the reaction zone was approximately 15 seconds. Upon starting of the run the analysis of the product gas was periodically taken. After 3¼ hours of reaction of the fluorocarbon production had decreased markedly. The analysis of the solids in the reactor at this time showed that only about 34.5 percent of the sodium fluorosilicate was converted to sodium chloride. The reactor contents was removed from the reactor and stirred with additional 6½ grams of chromic chloride. It was then replaced in the reactor and the run continued. Upon the restarting of the run, fluorocarbons were again produced in an amount and composition similar to that originally. After 5¾ hours of reaction time, the fluorocarbon production again had decreased with $CFCl_3$ being the only fluorocarbon produced. At this time the solids from the reactor were removed, agitated and again replaced in the reactor without the addition of more catalyst. After replacing the sodium fluorosilicate in the reactor, the run was continued for 4½ hours and then discontinued. The fluorocarbon produced at the beginning was approximately the same as that initially obtained. At the end of 4½ hours a marked decrease in fluorocarbon production was again indicated.

During the total time about 2.34 gram moles of carbon tetrachloride were passed through the reactor. In the effluent 0.35 gram mole of carbon tetrachloride was recovered and a total of 0.75 mole of fluorocarbons was obtained.

To show the effect of the addition of chlorine to the carbon tetrachloride, a similar run to that above was made. One hundred thirty grams of sodium silicafluoride to which 6.5 grams of anhydrous chromic chloride had been added was placed in the reactor. The reactor was heated to 350° C. and the carbon tetrachloride was fed at the same rate as above. In addition to the carbon tetrachloride about 0.1 to 0.3 cubic feet per hour of chlorine was added to the carbon tetrachloride stream. The addition of the chlorine gave a mole ratio of 10 moles of carbon tetrachloride to 1 mole of chlorine. The run was continued for 4 hours at which time no appreciable decrease in the fluorocarbon production was noticed during this time. In the four hours a total of 0.865 mole of carbon tetrachloride was passed through the reactor. Approximately 0.44 mole of carbon tetrachloride was recovered from the effluent as unreacted. The total amount of fluorocarbons produced was 0.357 gram mole. Thus a yield of 84 percent was obtained. Analysis of the solid residue in the reactor showed that 64.5 percent of the sodium silicafluoride was converted to sodium chloride.

What is claimed is:

1. A process for the fluorination of a compound selected from the group consisting of chlorine substituted aliphatic hydrocarbons and bromine substituted hydrocarbons in a vapor phase which comprises passing the substituted hydrocarbon in a vapor phase into contact with a fluorosilicate intermixed with a heavy metal chloride catalyst selected from the group consisting of chromium chloride, ferric chloride, tungsten chloride, molybdenum chloride, bismuth chloride, antimony chloride and mercury chloride in an amount of from 0.5 to 20 weight percent at a temperature of from 100° to 400° C. to fluorinate the substituted hydrocarbon, said fluorosilicate being selected from a group consisting of sodium fluorosilicate, potassium fluorosilicate, and barium fluorosilicate, and recovering the fluorinated substituted hydrocarbon from the reaction mixture.

2. A process according to claim 1 wherein the fluorosilicate is intermixed with the heavy metal chloride catalyst in an amount of from 5 to 10 weight percent.

3. A process for the fluorination of a compound selected from the group consisting of chlorine substituted aliphatic hydrocarbons and bromine substituted aliphatic hydrocarbons having from 1 to 8 carbon atoms in a vapor phase which comprises passing the substituted hydrocarbon in a vapor phase into contact with a fluorosilicate intermixed with a heavy metal chloride catalyst selected from the group consisting of chromium chloride, ferric chloride, tungsten chloride, molybdenum chloride, bismuth chloride, antimony chloride and mercury chloride in an amount of from 0.5 to 20 weight percent at a temperature of from 100° to 400° C. to fluorinate the substituted hydrocarbon, said fluorosilicate being selected from a group consisting of sodium fluorosilicate, potassium fluorosilicate, and barium fluorosilicate, and recovering the fluorinated substituted hydrocarbon from the reaction mixture.

4. A process according to claim 1 wherein the fluorosilicate is intermixed with the heavy metal chloride catalyst in an amount of from 5 to 10 and the temperature is in the range of 150° to 350° C.

5. A process for the fluorination of chlorine substituted aliphatic hydrocarbons having from 1 to 4 carbon atoms in a vapor phase which comprises passing the substituted hydrocarbon in a vapor phase into contact with a fluorosilicate intermixed with a heavy metal chloride catalyst selected from the group consisting of chromium chloride, ferric chloride, tungsten chloride, molybdenum chloride, bismuth chloride, antimony chloride and mercury chloride in an amount of from 0.5 to 20 weight percent at a temperature of from 100° to 400° C. to fluorinate the substituted hydrocarbon, said fluorosilicate being selected from a group consisting of sodium fluorosilicate, potassium fluorosilicate, and barium fluorosilicate, and recovering the fluorinated substituted hydrocarbon from the reaction mixture.

6. A process according to claim 5 wherein the fluorosilicate is intermixed with the heavy metal chloride catalyst in an amount of from 5 to 10 weight percent.

7. A process according to claim 6 wherein the fluorosilicate is sodium fluorosilicate, the heavy metal chloride catalyst is chromic chloride, and the substituted hydrocarbon is carbon tetrachloride.

8. A process according to claim 7 wherein the substituted hydrocarbon is trichloromethane.

9. A process for the fluorination of a compound selected from the group consisting of chlorine substituted aliphatic hydrocarbons and bromine substituted aliphatic hydrocarbons having from 1 to 8 carbon atoms which comprises intermixing a halogen having an atomic number between 17 and 35 with the substituted aliphatic hydrocarbon, passing the resulting mixture in the gaseous phase into contact with a fluorosilicate intermixed with a heavy metal chloride catalyst selected from the group consisting of chromium chloride, ferric chloride, tungsten chloride, molybdenum chloride, bismuth chloride, antimony chloride and mercury chloride in an amount of from 0.5 to 20 weight percent at a temperature of from 100° to 400° C. to fluorinate the substituted hydrocarbon, and recovering the fluorinated substituted hydrocarbon from the reaction mixture, said fluorosilicate being selected from the group consisting of sodium fluorosilicate, potassium fluorosilicate and barium fluorosilicate.

10. A process for the fluorination of chlorine substituted aliphatic hydrocarbons having from 1 to 4 carbon atoms which comprises intermixing chlorine with the substituted aliphatic hydrocarbon, passing the resulting mixture in gaseous phase into contact with a fluorosilicate intermixed with a heavy metal chloride catalyst selected from the group consisting of chromium chloride, ferric chloride, tungsten chloride, molybdenum chloride, bismuth chloride, antimony chloride and mercury chloride in an amount of from 0.5 to 20 weight percent at a temperature of from 100° to 400° C. to fluorinate the substituted hydrocarbon, and recovering the fluorinated substituted hydrocarbon from the reaction mixture, said fluorosilicate being selected from the group consisting of sodium fluorosilicate, potassium fluorosilicate and barium fluorosilicate.

11. A process according to claim 10 wherein the fluorosilicate is intermixed with the heavy metal chloride catalyst in an amount of 5 to 10 weight percent of the catalyst and the temperature is in the range of 150° to 350° C.

12. A process according to claim 11 wherein the fluorosilicate is sodium fluorosilicate, the catalyst is chromic chloride and the chlorine substituted aliphatic hydrocarbon is carbon tetrachloride.

13. A process according to claim 11 wherein the fluorosilicate is sodium fluorosilicate, the catalyst is chromic chloride, and the chlorine substituted aliphatic hydrocarbon is trichloromethane.

14. A process for the fluorination of a chlorine substituted aliphatic hydrocarbon which comprises intermixing an aliphatic hydrocarbon with chlorine, passing the resulting mixture in a gaseous phase into contact with a fluorosilicate intermixed with a heavy metal chloride catalyst selected from the group consisting of chromium chloride, ferric chloride, tungsten chloride, molybdenum chloride, bismuth chloride, antimony chloride and mercury chloride in an amount of from 6 to 20 weight percent of the catalyst at a temperature of from 100° to 400° C. to form the chlorine substituted aliphatic hydrocarbon in situ and to fluorinate the chlorine substituted hydrocarbon, said fluorosilicate being selected from the group consisting of sodium fluorosilicate, potassium fluorosilicate and barium fluorosilicate, and recovering the fluorinated substituted hydrocarbons from the reaction mixture.

15. A process according to claim 14 wherein the aliphatic hydrocarbon is methane, the fluorosilicate is sodium fluorosilicate and the catalyst is chromic chloride.

References Cited in the file of this patent
UNITED STATES PATENTS 2,924,624    Forshey _____ Feb. 9, 1960

OTHER REFERENCES

Lovelace et al.: Aliphatic Fluorine Compounds, pp. 1, 2, 10–12, Rheinhold Pub. Co. (1958).